United States Patent
Ahn et al.

(10) Patent No.: US 8,938,855 B2
(45) Date of Patent: Jan. 27, 2015

(54) GEAR HINGE DEVICE FOR PORTABLE APPARATUS

(71) Applicant: Samsung Electronics Co., Ltd., Gyeonggi-do (KR)

(72) Inventors: Sung-Ho Ahn, Seoul (KR); Kun-Woo Baek, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 12 days.

(21) Appl. No.: 13/687,096

(22) Filed: Nov. 28, 2012

(65) Prior Publication Data

US 2013/0152342 A1    Jun. 20, 2013

(30) Foreign Application Priority Data

Dec. 14, 2011    (KR) .......................... 10-2011-0134205

(51) Int. Cl.
| | | |
|---|---|---|
| E05D 7/00 | (2006.01) | |
| F16C 11/04 | (2006.01) | |
| G06F 1/16 | (2006.01) | |
| H04M 1/02 | (2006.01) | |
| E05D 3/12 | (2006.01) | |

(52) U.S. Cl.
CPC .............. *F16C 11/04* (2013.01); *G06F 1/1681* (2013.01); *H04M 1/022* (2013.01); *E05Y 2900/606* (2013.01); *E05D 3/122* (2013.01)
USPC ...... 16/354; 16/366; 361/679.01; 361/679.27

(58) Field of Classification Search
USPC ................. 16/354, 366; 361/679.56, 361/679.26–679.28, 679.01, 679.09, 361/679.15, 679.55; 455/575.3
See application file for complete search history.

(56) References Cited

U.S. PATENT DOCUMENTS

| | | | | |
|---|---|---|---|---|
| 4,916,926 | A * | 4/1990 | Shieh ............................... | 70/135 |
| 5,847,685 | A * | 12/1998 | Otsuki ............................ | 345/87 |
| 6,011,685 | A * | 1/2000 | Otsuki ...................... | 361/679.01 |
| 6,925,684 | B2 * | 8/2005 | Kang et al. ...................... | 16/264 |
| 8,411,427 | B2 * | 4/2013 | Jeong et al. .............. | 361/679.27 |
| 8,514,558 | B2 * | 8/2013 | Song ........................ | 361/679.27 |
| 2003/0027628 | A1 * | 2/2003 | Luciano ........................ | 463/20 |
| 2003/0135953 | A1 * | 7/2003 | Park et al. ........................ | 16/62 |
| 2005/0122671 | A1 * | 6/2005 | Homer ........................ | 361/681 |
| 2009/0282650 | A1 * | 11/2009 | Jin et al. .......................... | 16/367 |
| 2010/0050380 | A1 * | 3/2010 | Fujiwara et al. ................ | 16/242 |
| 2010/0277860 | A1 * | 11/2010 | Jeong et al. .............. | 361/679.27 |
| 2010/0299873 | A1 * | 12/2010 | Song .............................. | 16/236 |

FOREIGN PATENT DOCUMENTS

| | | | |
|---|---|---|---|
| KR | 20-0439610 Y1 | 4/2008 | |
| KR | 10-0909713 B1 | 7/2009 | |

* cited by examiner

*Primary Examiner* — Victor Batson
*Assistant Examiner* — Matthew Sullivan
(74) *Attorney, Agent, or Firm* — Cha & Reiter, LLC

(57) ABSTRACT

Disclosed is a gear hinge device employed in a portable apparatus including first and second housings. The gear hinge device connects the first and second housings in such a manner such that the first and second housings can be rotated about first and second hinge axes, respectively. The gear hinge device includes: a first driving unit comprising a first driving cam gear that is rotated about the first hinge axis and a second driving unit comprising a second driving cam gear that is engaged with the first driving cam gear and rotated about the second hinge axis that is parallel to the first hinge axis and a flexible auxiliary gear that is arranged coaxially to the second driving cam gear.

20 Claims, 6 Drawing Sheets

GEAR HINGE DEVICE FOR PORTABLE APPARATUS

CLAIM OF PRIORITY

This application claims the priority under 35 U.S.C. §119(a) from an application entitled "Gear Hinge Device For Portable Apparatus" filed in the Korean Industrial Property Office on Dec. 14, 2011 and assigned Serial No. 10-2011-0134205, the contents of which are hereby incorporated by reference in its entirety.

BACKGROUND OF THE INVENTION

1. Field of the Invention

The present invention relates to a portable apparatus, including but not limited to a cellular phone, a notebook computer, a smart phone, a PDA, a game machine or the like, and more particularly to a gear hinge device that provides two parallel hinge axes for opening and closing opposed portions of a folder type portable apparatus by rotation about two parallel axes.

2. Description of the Related Art

Among various types of portable apparatuses classified by appearances, a folder-type portable apparatus essentially includes a hinge device for rotatably connecting two housings. The hinge device may be configured to provide either a single hinge axis or two hinge axes. That is, the hinge device may be employed in a portable apparatus as a single-axis hinge device for providing a single hinge axis or as a dual-axis hinge device for providing two hinge axes, in this way the two opposed portions of the folder type portable apparatus may open and close by rotating about a single axis or by rotation about two parallel axes.

In general, a hinge device employed in a folder-type portable apparatus essentially employs a cam unit (a driving cam and a driven cam), and an elastic member to provide a stopping angle of the housing of the portable apparatus as being rotated, and offers convenience to a user when opening/closing the portable apparatus by incorporating the cam action between the elastic member and the driving and driven cams of the cam unit. In order to provide convenience to the user for opening/closing the portable apparatus, it is preferable that the hinge device should provide a force for continuously maintaining the folder type portable apparatus in a closed state when it is closed. Likewise, the hinge device should provide a force for opening the portable apparatus by a first predetermined angle or more, and the hinge device should also provide a force for stopping the folder at a second predetermined angle.

A dual-axis hinge device is disclosed in the publication of Korean Utility Model Registration No. 20-0439610 (Application No. 20-2007-0002620).

However, the hinged cover opening/closing device disclosed in the prior art utility model publication has a problem in that even if there is a minute deviation that occurs at a peak of the gear teeth, then a deviation may be caused in the opening/closing movement of the folder type portable apparatus and thus disrupt the smooth opening/closing movement of the folder, and thus will deteriorate the reliability of the final product.

In addition, the hinged cover opening/closing device disclosed in that prior art utility model publication has a further problem in that the gear unit employed therein is fabricated through die-casting process, which will cause an increase of manufacturing costs.

Therefore, the present invention is intended to provide a stable opening/closing movement (a smooth opening/closing movement) of a dual-axis hinge device that is inexpensive to manufacture and implement.

SUMMARY OF THE INVENTION

Accordingly, an exemplary aspect of the present invention is to solve the above-mentioned problems that exist in the prior art, and to provide a gear hinge device that is employed in a folder-type portable apparatus to provide a stable and smooth gear operation for opening/closing the portable apparatus.

Another exemplary aspect of the present invention is to provide a gear hinge device for a portable apparatus, in which the gear hinge device includes a driving cam gear and an auxiliary gear that is formed from a flexible material different from that of the driving cam gear, so that a smooth opening/closing movement can be provided when the portable apparatus is opened/closed.

Also, another exemplary aspect of the present invention is to provide a gear hinge device for a portable apparatus as described above, in which as compared to the gear teeth of the driving cam gear, the number of the gear teeth of the auxiliary gear may be equal to or different from the number of the gear teeth of the driving cam gear, a phase shift of the gear teeth of the auxiliary gear may be equal to or different from that of the gear teeth of the driving cam gear, while each of the gear teeth of the auxiliary gear has a size equal to or slightly larger than that of the driving cam gear.

In accordance with another exemplary aspect of the present invention, there is provided a gear hinge device for connecting first and second housings of a portable terminal in such a manner that the first and second housings can be rotated about first and second hinge axes, respectively, wherein the gear hinge device includes: a first driving unit including a first driving cam gear that is rotated about the first hinge axis, and a first auxiliary gear; and a second driving unit including a second driving cam gear that is engaged with the first driving cam gear and rotated about the second hinge axis that is parallel to the first hinge axis, and a second auxiliary gear, wherein the first and second driving cam gears are arranged coaxially to the first and second auxiliary gears, respectively, and the first and second auxiliary gears are arranged to be engaged with each other.

In accordance with another exemplary aspect of the present invention, there is provided a gear hinge device for connecting first and second housings of a portable terminal in such a manner that the first and second housings can be rotated about first and second hinge axes, respectively, wherein the gear hinge device includes: a first driving unit including a first driving cam gear that is rotated about the first hinge axis; and a second driving unit including a second driving cam gear that is engaged with the first driving cam gear and rotated about the second hinge axis that is parallel to the first hinge axis, and a flexible auxiliary gear that is arranged coaxially to the second driving cam gear.

BRIEF DESCRIPTION OF THE DRAWINGS

The above and other exemplary aspects, features and advantages of certain exemplary embodiments of the GEAR HINGE DEVICE FOR PORTABLE APPARATUS in accordance with the present invention will be more apparent to a person of ordinary skill in the art from the following detailed description taken in conjunction with the accompanying drawings, in which.

DETAILED DESCRIPTION

Figure 1:
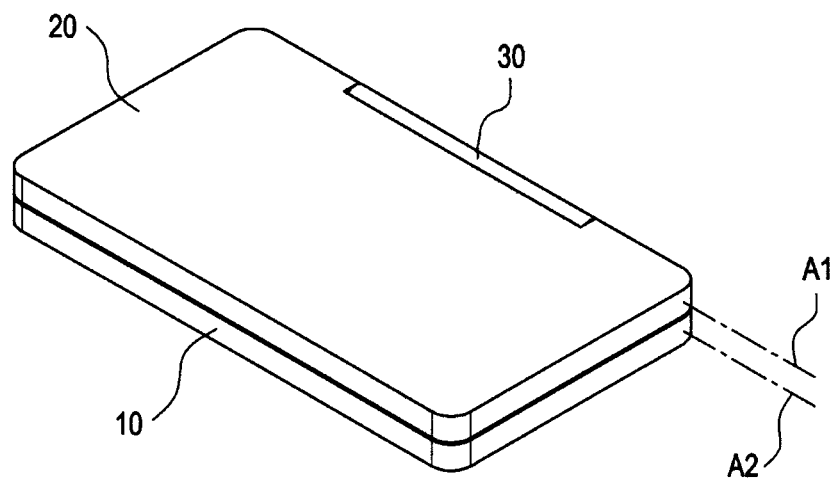
FIG. 1 is a perspective view showing a portable apparatus in the closed state, in which a gear hinge device in accordance with an exemplary embodiment of the present invention is employed in the portable apparatus.

Hereinafter, exemplary embodiments of the present invention will be described with reference to the accompanying drawings. In the following description, well-known functions or constructions may not be described in detail when they would obscure appreciation of the present invention by a person of ordinary skill in the art with unnecessary detail of the well-known functions and structures. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art. In the following description, the same elements will be designated by the same reference numerals although they are shown in different drawings.

Figure 2:
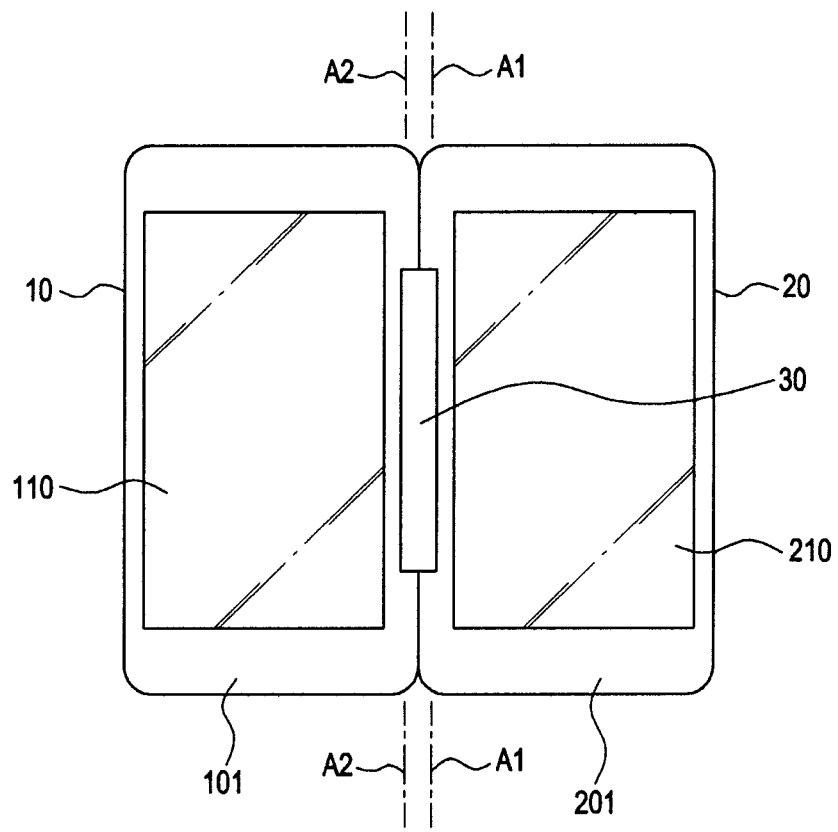
FIG. 2 is a top plan view of the portable apparatus of FIG. 1 in a 180 degree-opened state.

FIGS. 1 and 2 show a portable apparatus in which a gear hinge device 30 in accordance with an exemplary embodiment of the present invention is employed. FIG. 1 shows the portable apparatus in the closed state, and FIG. 2 shows the portable apparatus in the opened (rotated by 180 degrees) state.

As shown in FIGS. 1 and 2, the portable apparatus preferably includes a first housing 10, a second housing 20, and a gear hinge device 30 for connecting the second housing 20 with the first housing 10 in such a manner that the second housing 20 and the first housing 10 can be rotated about first and second hinge axes A1 and A2, respectively. In FIGS. 1 and 2, only the hinge housing of the hinge device 30 is shown. On the inner face 101 of the first housing 10, there is provided a data input unit (or data input/output unit) 110, and on the inner face 201 of the second housing 20, there is provided a data output unit (or data input/output unit) 210. The data input unit 110 may employ a keypad, and the data output unit 210 may employ a display unit, such as an LCD display, and an AMOLED display. If a data input/output unit is provided on each of the inner faces of the first and second housings 10 and 20, a touch screen may be employed as the data input/output unit.

Figure 3:
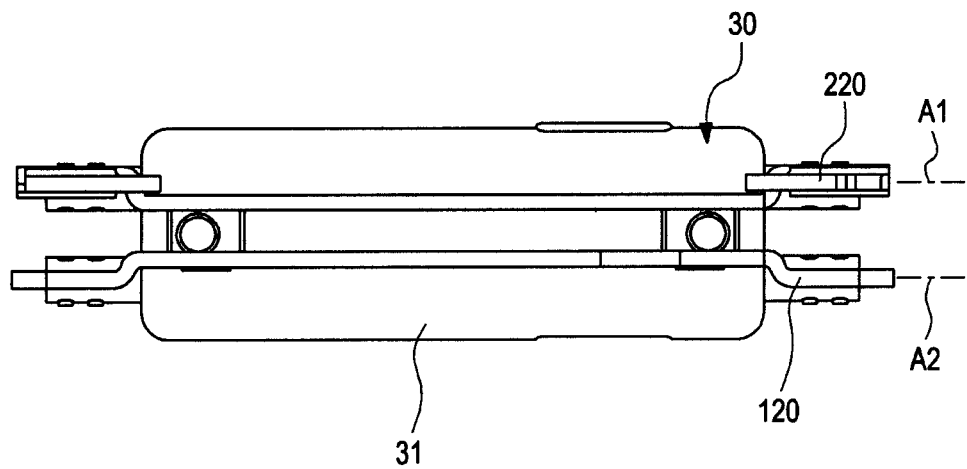
FIG. 3 is a front view of the inventive gear hinge device in the closed state, in which the gear hinge device is arranged on first and second frames.
Figure 4:
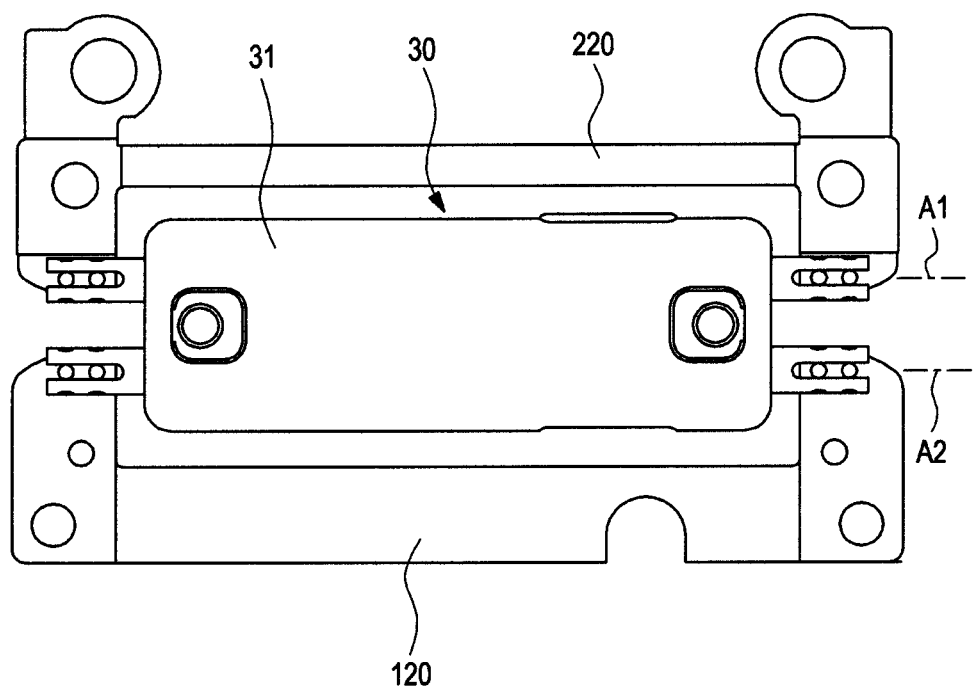
FIG. 4 is a front view of the inventive gear hinge device of FIG. 3 in the 180 degree-opened state.

As shown in FIGS. 3 and 4, the hinge device 30 is fastened to first and second frames 120 and 220, so that the hinge device 30 can be coupled to the first and second housings 10 and 20 as shown in FIGS. 1 and 2. The first frame 120 is fastened to the first housing 10, and the second frame 220 is fastened to the second housing 20. Consequently, the first and second frames 120 and 220 are fastened to first and second hinge shafts, which are the first and second housings 10 and 20, respectively. As the first and second housings 10 and 20 are rotated, the first and second hinge shafts are also rotated.

The hinge device 30 in accordance with a first exemplary embodiment of the present invention will be described in detail with reference to FIGS. 5 to 8. The hinge device 30 is a dual-axis hinge device for smoothening the opening/closing movement of the portable apparatus, in which a flexible auxiliary gear is additionally provided so as to provide smoothness in the opening/closing movement.

Figure 5:
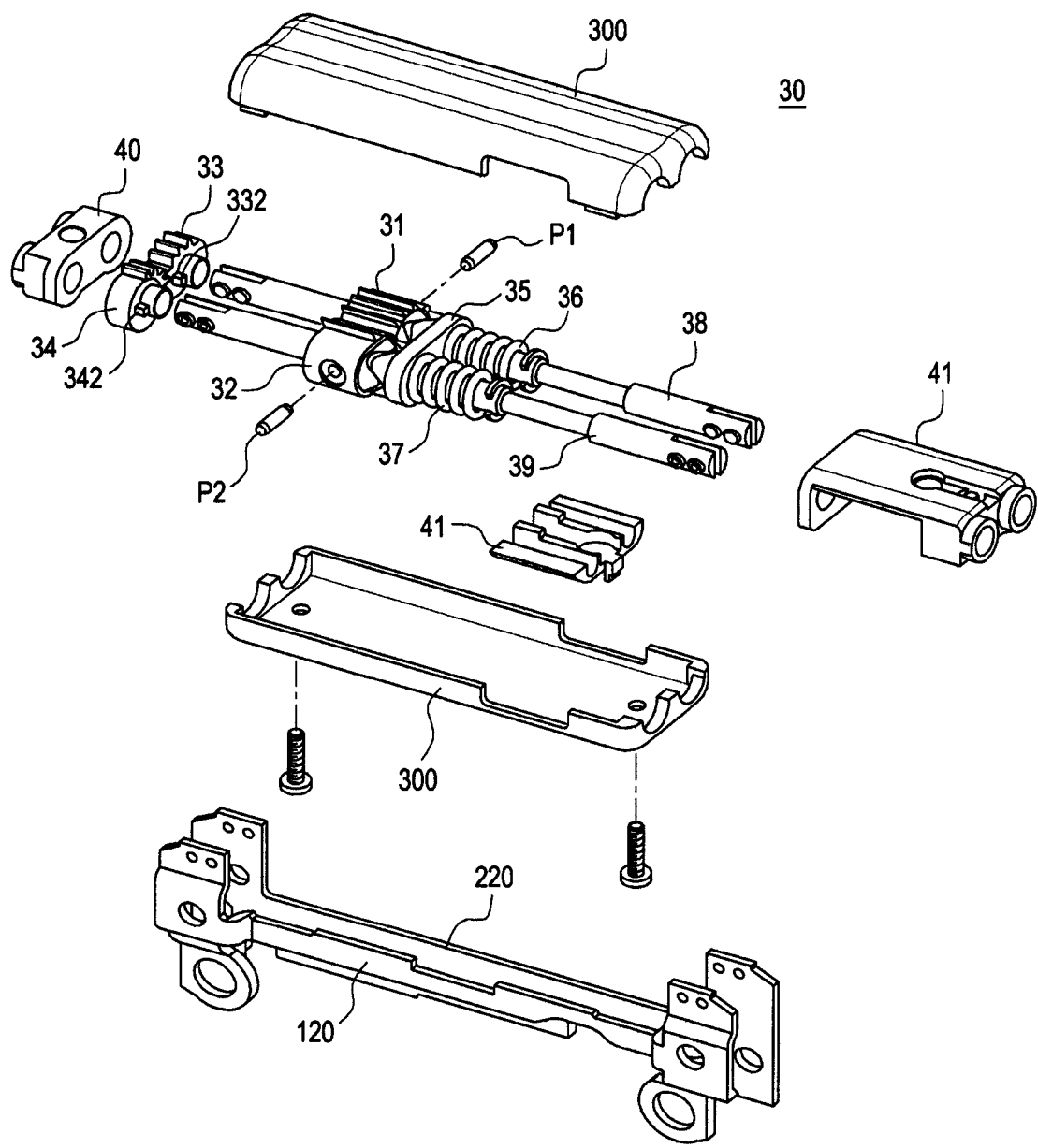
FIG. 5 is an exploded perspective view showing a gear hinge device in accordance with a first exemplary embodiment of the present invention.
Figure 6:
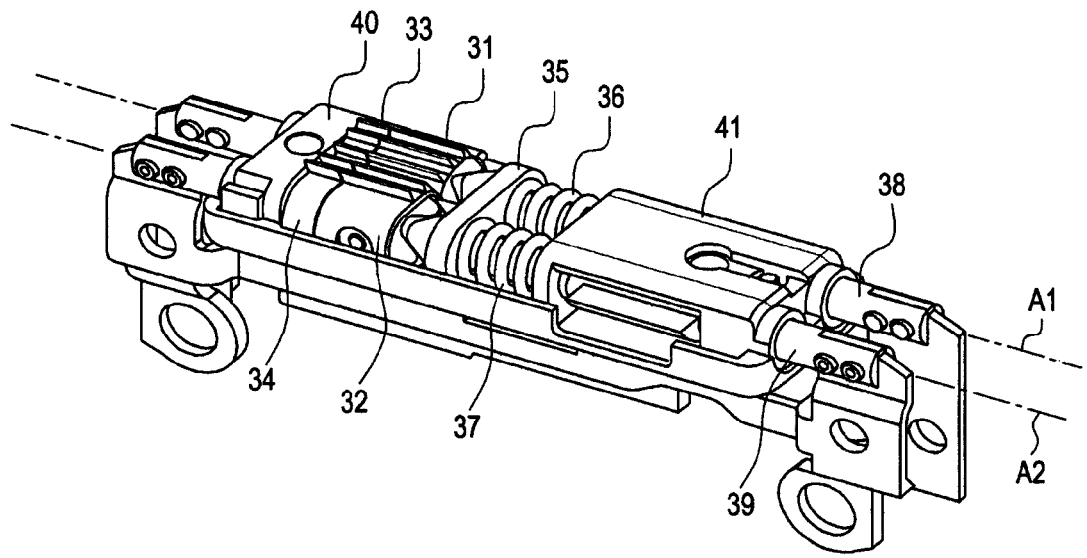
FIG. 6 and FIG. 7 are top side and bottom side perspective views of the gear hinge device in accordance with the first exemplary embodiment of the present invention in the assembled state.
Figure 7:
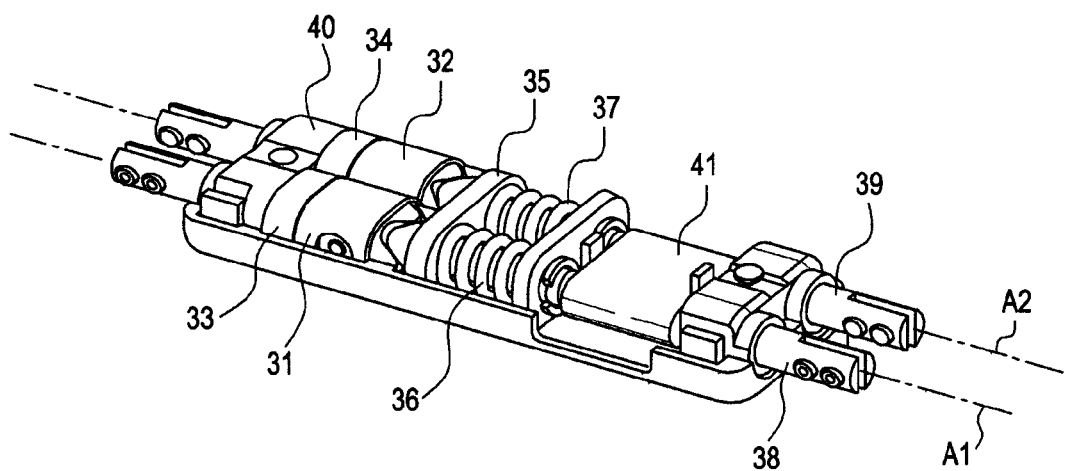

As shown in FIGS. 5 to 7, the hinge device 30 includes a hinge housing 300, first and second driving units (plural cams and hinge springs), first and second shafts 38 and 39, and two guides 40 and 41. The hinge housing 300 is formed by coupling two housing parts, wherein the first and second driving units, the first and second shafts 38 and 39, and the guides 40 and 41 are received in the hinge housing 300. The first and second driving units are moved about the first and second hinge axes A1 and A2, respectively, to provide an opening force, a closing force or a stopping force to the first and second housings (through a cam action), and to implement a damping function (through an engagement movement of gears) so as to assure a smooth opening/closing movement. A detailed construction of the first and second driving units will be described below.

The first and second shafts 38 and 39 are basic rotation shafts for providing the first and second hinge axes A1 and A2, in which the first and second driving units, two guides 40 and 41 and the housing 300 are mounted on the first and second shafts 38 and 39. The guides 40 and 41 include a first coupling guide bushing 40 for binding first and second driving units to the first and second shafts, and a flexible circuit guide 41, through which a flexible circuit (not shown) extends.

The coupling guide bushing 40 and the flexible circuit guide 41 are positioned at the opposite ends of the hinge housing 300 to rotatably support the first and second hinge shafts 38 and 39, and the first and second driving units are mounted between the bushing 40 and the guide 41.

Now, the constructions of the inventive first and second driving units will be described with reference to FIG. 8.

The first driving unit includes a first driving cam gear 31, a first auxiliary gear 33, a first hinge spring 36 and a single driven cam 35. The first driving cam gear 31 conducts a cam action and gear action as it is rotated. For this purpose, the first driving cam gear 31 includes a first set of gear teeth 310, and a first set of cam teeth 312. The first set of gear teeth 310 are provided on the peripheral surface of the first driving cam gear 31, and the first set of cam teeth 312 are provided on one end face of the first driving cam gear 31. The first set of gear teeth 310 are arranged in a predetermined area on the peripheral surface, and the first set of cam teeth 312 are provided in such a manner that peaks and valleys are alternately arranged. In addition, the first driving cam gear 31 is anchored to the first hinge shaft 38 by a first anchor pin P1 (see FIG. 5). The first anchor pin P1 is fitted in a direction perpendicular to the direction of fitting the first driving cam gear 31 on the first shaft 38, so that the first driving cam gear 31 is integrally anchored to the first shaft 38.

The first auxiliary gear 33 is coupled to the first driving cam gear 31 in a direction along the first hinge axis A1 to conduct a gear action together with the first driving cam gear 31. The first auxiliary gear 33 includes a first set of auxiliary gear teeth 330 on the peripheral surface thereof, and a first coupling part 332 on an end face thereof. The first set of auxiliary gear teeth 330 are arranged in a predetermined area on the peripheral surface. The first coupling part 332 is a first protrusion extending in the direction of the first hinge axis (toward the first driving cam gear side), in which the first coupling part integrally couples the first auxiliary gear 33 to the first driving cam gear 31 in the direction of the first hinge axis, so that the first auxiliary gear 33 and the first driving cam gear 31 can be rotated in unison.

The second driving unit includes a second driving cam gear 32, a second auxiliary gear 34, and a second hinge spring 37. The second driving cam gear 32 conducts a cam action and gear action as it is rotated. For this purpose, the second driving cam gear 32 includes a second set of gear teeth 320, and a second set of cam teeth 322. The second set of gear teeth 320 are provided on the peripheral surface of the first driving cam gear 32, and the second set of cam teeth 322 are provided on one end face of the second first driving cam gear 32. The second set of gear teeth 320 are arranged in a predetermined area on the peripheral surface, and the second set of cam teeth 322 are provided in such a manner that peaks and valleys are alternately arranged. In addition, the second driving cam gear 32 is anchored to the second hinge shaft 39 by a second anchor pin P2 (see FIG. 5). The second anchor pin P2 is fitted in a direction perpendicular to the direction of fitting the second driving cam gear 32 on the second shaft 39, so that the second driving cam gear 32 is integrally anchored to the second shaft 39.

The second auxiliary gear 34 is coupled to the second driving cam gear 32 in the direction of the second hinge axis A2 to conduct a gear action together with the second driving cam gear 32. The second auxiliary gear 34 includes a second set of auxiliary gear teeth 340 on the peripheral surface thereof, and a second coupling part 342 on an end face thereof. The second set of auxiliary gear teeth 340 are arranged in a predetermined area on the peripheral surface. The second coupling part 342 is a second protrusion extending in the direction of the second hinge axis (toward the second driving cam gear side), in which the second coupling part integrally couples the second auxiliary gear 34 to the second driving cam gear 32 in a direction along the second hinge axis, so that the second auxiliary gear 34 and the second driving cam gear 32 can be rotated in unison.

Because each of the first and second driving cam gears 31 and 32 includes plural gear teeth, if one of the driving cam gears 31 and 32 is rotated, the other is simultaneously rotated. In addition, because each of the first and second auxiliary gears 33 and 34 includes plural gear teeth, if one of the auxiliary gears 33 and 34 is rotated, the other is simultaneously rotated.

It was described above that for the purpose of smoothening the opening/closing action, the first and second flexible auxiliary gears 33 and 34 are coupled to the first and second driving cam gears 31 and 32, respectively. The first and second driving cam gears 31 and 32 are formed from a rigid material (for example, a rigid plastic material), whereas the first and second auxiliary gears 33 and 34 are formed from a flexible resilient material, which provides a damping effect when the portable apparatus is opened/closed. That is, although each of the first and second auxiliary gears 33 and 34 is kept in the original shape thereof when they are not operated, they are engaged with the first and second driving cam gears 31 and 32 in a slightly compressed condition, respectively, when they are operated.

As compared to the gear teeth provided on the peripheral surface of the first driving cam gear 31, the gear teeth 330 provided on the peripheral surface of the first auxiliary gear 33 may be formed in a number equal to or different from the number of the gear teeth of the first driving cam gear 31, and/or may be fixed in a phase shift equal to or different from those of the first driving gear 31. In addition, as compared to the gear teeth 320 provided on the peripheral surface of the second driving cam gear 32, the gear teeth 340 provided on the peripheral surface of the second auxiliary gear 34 may be formed in a number equal to or different from the number of the gear teeth of the second driving cam gear 32, and/or may be fixed in a phase shift equal to or different from those of the second driving gear 32.

Figure 8:
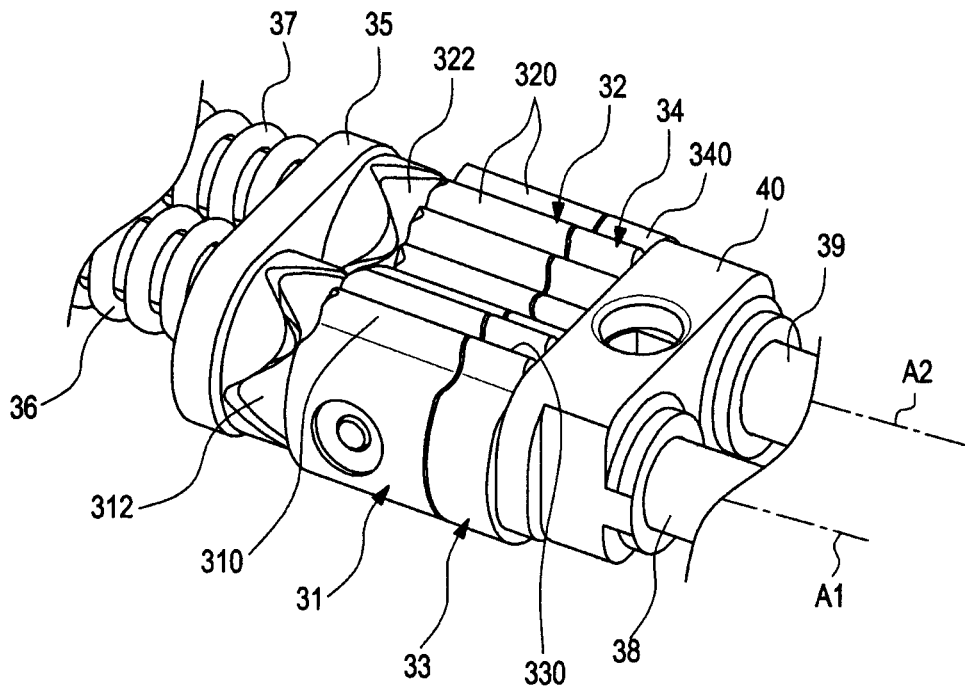
FIG. 8 is a perspective view showing the first and second driving units of the gear hinge device in accordance with the first exemplary embodiment of the present invention.

FIG. 8 shows that the gear teeth of the first and second auxiliary gears 33 and 34 are formed in the same number and same phase shift with those of the first and second driving cam gears, respectively. However, because the first and second auxiliary gears are formed from a flexible resilient material, they may be formed in a number and phase shift that are different from those of the first and second driving cam gears.

In addition, considering the flexibility of the first and second auxiliary gears 33 and 34, the auxiliary gears may be formed in a size equal to or slightly larger than the first and second driving cam gears 31 and 32, respectively. In the entire sizes, the first and second auxiliary gears 33 and 34 are larger than the first and second driving cam gears 31 and 32, respectively. That is, the first and second auxiliary gears 33 and 34 are formed to be larger than the first and second driving cam gears 31 and 32, respectively, in terms of tooth size as well as overall diameter. This is implemented so as to ensure that the gear action therebetween can be smoothly conducted in consideration of the fact that the auxiliary gears are compressed when the hinge device is operated (i.e., when the auxiliary gears are engaged with the driving cam gears). Of course, the first and second driving cam gears 31 and 32 are formed to the same construction, and the first and second auxiliary gears 33 and 34 are also formed to the same construction. In addition, because the first and second auxiliary gears 33 and 34 are formed from a flexible material, a smooth gear action can be obtained only when the first and second auxiliary gears are slightly compressed at the time of conducting the gear action. In addition, because the gear teeth of the first and second auxiliary gears 33 and 34 are formed in a number equal to or different from that of the teeth of the first and second driving cam gears 31 and 32, respectively, and/or in a phase shift equal to or different from that of the teeth of the first and second driving cam gears 31 and 32, respectively, the first and second driving cam gears 31 and 32 and the first and second auxiliary cams 33 and 34 will be rotated while being engaged with each other.

The single driven cam 35 is engaged with each of the first and second driving cam gears 31 and 32 to conduct a cam action. The driven cam 35 is supported by the first and second hinge springs 36 and 37 to be in close contact with the first and second driving cam gears 31 and 32. As the first and second driving cam gears 31 and 32 are rotated, the driven cam 35 conducts a cam movement, thereby being linearly moved back and forth along the first and second hinge shafts 38 and 39 in the direction of the first and second hinge axes A1 and A2. As the cam movement is conducted between the single driven cam 35 and the first and second driving cam gears 31 and 32, a stopping force is provided to the first or second housing.

Referring to FIGS. 6 and 7, the first and second driving cam gears 31 and 32 are opposed to and in close contact with the single driven cam 35. As the first and second driving cam gears 31 and 32 are rotated, the single driven cam 35 is moved along the first and second hinge axes A1 and A2 simultaneously in response to the cam action with the first and second driving cam gears 31 and 32 bearing against the single driven cam 35. The first and second driving cam gears 31 and 32 may be formed from a synthetic resin, e.g. a rigid plastic material.

The single driven cam 35 includes one or more cam peaks and valleys in a set to cause a cam action with the cam protrusions and cam grooves on the first driving cam gear 31 as the first and second driving cam gears 31 and 32 are rotated. When the cam protrusions of the driven cam 35 are completely inserted into the cam grooves of the first and second driving cam gears 31 and 32, respectively, the first and second hinge springs 36 and 37 are in the most tensioned state, and when the cam protrusions completely escape from the cam grooves, the first and second hinge springs 36 and 37 are compressed. Each of the first and second hinge springs 36 and 37 is a compression/tension coil spring.

FIGS. 6 to 8 show the coupling guide bushing and the flexible circuit guide in the mounted state. As shown in FIGS. 6 to 8, the coupling guide bushing 40 and the flexible circuit guide 41 are mounted on the first and second shafts 38 and 39, respectively, and the first and second units are mounted therebetween. The coupling guide bushing 40 supports the first and second driving units in the state of being received in the hinge housing. The flexible circuit guide 41 is received in the hinge housing, and receives a flexible circuit not shown in the drawings.

Figure 9:
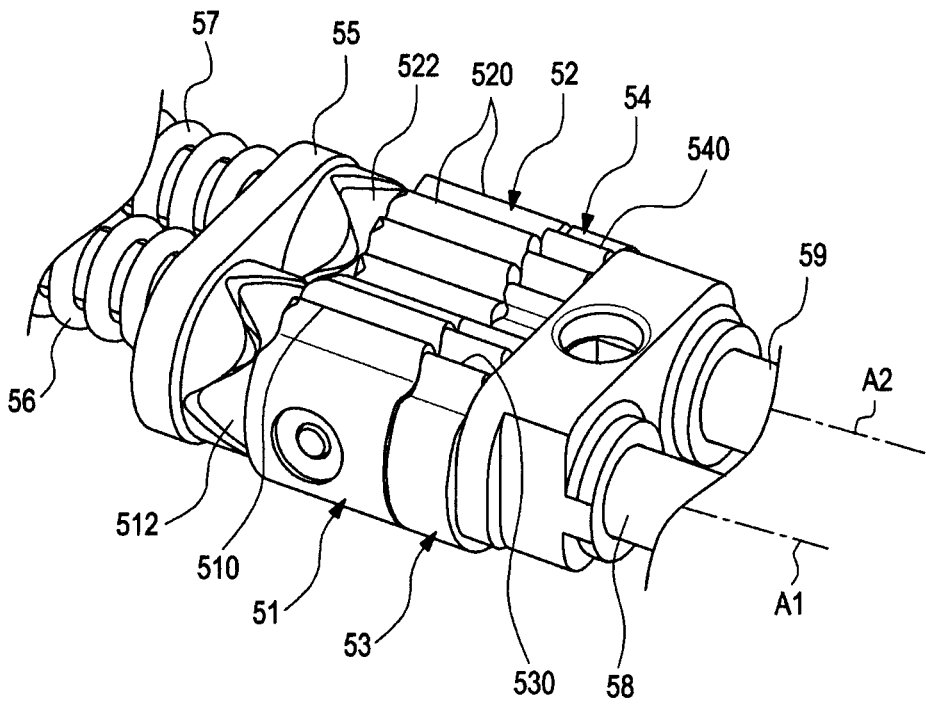
FIG. 9 is a perspective view showing the first and second driving units of a gear hinge device in accordance with a second exemplary embodiment of the present invention.

FIG. 9 shows a gear hinge device including first and second driving units in accordance with an exemplary second embodiment of the present invention, in which because the present embodiment is the same in construction with the first embodiment except for the first and second driving units, only the constructions of the first and second driving units will be described.

As shown in FIG. 9, the first driving unit includes a first driving cam gear 51, a first auxiliary gear 53, a first hinge spring 56 and a single driven cam 55. The first driving cam gear 51 conducts a cam action and gear action as it is rotated. For this purpose, the first driving cam gear 51 includes a first set of gear teeth 510, and a first set of cam teeth 512. The first set of gear teeth 510 are provided on the peripheral surface of the first driving cam gear 51, and the first set of cam teeth 512 are provided on one end face of the first driving cam gear 51. The first set of gear teeth 510 are arranged in a predetermined area on the peripheral surface, and the first set of cam teeth 512 are provided in such a manner that peaks and valleys are alternately arranged.

The first auxiliary gear 53 is coupled to the first driving cam gear 51 in the direction of the first hinge axis A1 to conduct a gear action together with the first driving cam gear 51. The first auxiliary gear 53 includes a first set of auxiliary gear teeth 530 on the peripheral surface thereof, and a first coupling part (not shown but equal to that shown in FIG. 5) on an end face thereof. The first set of auxiliary gear teeth 530 are arranged in a predetermined area on the peripheral surface. The first coupling part is a first protrusion extending in the direction of the first hinge axis (toward the first driving cam gear side), in which the first coupling part integrally couples the first auxiliary gear 53 to the first driving cam gear 51 in a direction along the first hinge axis, so that the first auxiliary gear 53 and the first driving cam gear 51 can be rotated in unison.

The second driving unit includes a second driving cam gear 52, a second auxiliary gear 54, and a second hinge spring 57. The second driving cam gear 52 conducts a cam action and gear action as it is rotated. For this purpose, the second driving cam gear 52 includes a second set of gear teeth 520, and a second set of cam teeth 522. The second set of gear teeth 520 are provided on the peripheral surface of the second driving cam gear 52, and the second set of cam teeth 522 are provided on one end face of the second first driving cam gear 52. The second set of gear teeth 520 are arranged in a predetermined area on the peripheral surface, and the second set of cam teeth 522 are provided in such a manner that peaks and valleys are alternately arranged.

The second auxiliary gear 54 is coupled to the second driving cam gear 52 in a direction along the second hinge axis A2 to conduct a gear action together with the second driving cam gear 52. The second auxiliary gear 54 includes a second set of auxiliary gear teeth 540 on the peripheral surface thereof, and a second coupling part (not shown but identical to that shown in FIG. 5) on an end face thereof. The second set of auxiliary gear teeth 540 are arranged in a predetermined area on the peripheral surface. The second coupling part is a second protrusion extending in the direction of the second hinge axis (toward the second driving cam gear side), in which the second coupling part integrally couples the second auxiliary gear 54 to the second driving cam gear 52 in the direction of the second hinge axis, so that the second auxiliary gear 54 and the second driving cam gear 52 can be rotated in unison.

Because each of the first and second driving cam gears 51 and 52 includes plural gear teeth which are in engagement, if one of the driving cam gears 51 and 52 is rotated, the other is simultaneously rotated. In addition, because each of the first and second auxiliary gears 53 and 54 includes plural gear teeth, if one of the auxiliary gears 53 and 54 is rotated, the other is simultaneously rotated.

For the purpose of smoothening the opening/closing action, the first and second driving cam gears 51 and 52 are coupled to the first and second auxiliary gears 53 and 54, in which the first and second auxiliary gears are formed from a flexible resilient material. The first and second driving cam gears 51 and 52 are formed from a rigid material (for example, a rigid plastic material), whereas the first and second auxiliary gears 53 and 54 are formed from a flexible material, which provides a damping effect at the time when a gear action is occurring, for example opening/closing the portable apparatus. That is, although each of the first and second auxiliary gears 53 and 54 is kept in the original shape thereof when they are not operated, they are engaged with the first and second driving cam gears 51 and 52 in a slightly compressed condition, respectively, when they are operated.

As compared to the gear teeth provided on the peripheral surface of the first driving cam gear 51, the gear teeth 530 provided on the peripheral surface of the first auxiliary gear 53 may be formed in a number that may be equal to or different from the number of the gear teeth of the first driving cam gear, and may be fixed in the same phase shift or a different phase shift. In addition, the gear teeth 540 provided on the peripheral surface of the second auxiliary gear 54 may be formed in a number that may be equal to or different from that of the gear teeth 520 provided on the peripheral surface of the second driving cam gear 52, and/or may be fixed in a phase shift equal to or different from that of the gear teeth 520 provided on the peripheral surface of the second driving cam gear 52.

At this time, the gear teeth 530 formed on the peripheral surface of the first auxiliary gear 53 are fixed in a number and phase shift that are different from those of the gear teeth 530 formed on the peripheral surface of the first driving cam gear 51, and the gear teeth 540 formed on the peripheral surface of the second auxiliary gear 54 are fixed in a number and phase shift that are different from those of the gear teeth 520 formed on the peripheral surface of the second driving cam gear 52. Although the gear teeth of the first and second auxiliary gears may be provided in a number and phase shift that are different from those of the first and second driving cam gears, a smooth gear action, in particular a smooth and soft gear action can be provided because the first and second auxiliary gears are formed from a flexible resilient material.

In addition, considering the flexibility of the first and second auxiliary gears 53 and 54, the auxiliary gears are formed slightly larger than the first and second driving cam gears 51 and 52, respectively. In the overall sizes, the first and second auxiliary gears 53 and 54 are larger than the first and second driving cam gears 51 and 52, respectively. That is, the first and second auxiliary gears 53 and 54 are formed to be larger than the first and second driving cam gears 51 and 52, respectively, in terms of tooth size as well as diameter. This is implemented so as to ensure that the gear action therebetween can be smoothly conducted in consideration of the fact that the auxiliary gears bear against each other and are thus compressed when the hinge device is operated (i.e., when the auxiliary gears are engaged with the driving cam gears). Of course, the first and second driving cam gears 51 and 52 are formed to have the same construction, and the first and second auxiliary gears 53 and 54 are formed to have the same construction. In addition, because the first and second auxiliary gears 53 and 54 are formed from a flexible resilient material, a smooth gear action can be obtained only when the first and second auxiliary gears are slightly compressed at the time of conducting the gear action.

The single driven cam 55 is engaged with each of the first and second driving cam gears 51 and 52 to conduct a cam action. The driven cam 55 is supported by the first and second hinge springs 56 and 57 to be in close contact with the first and second driving cam gears 51 and 52. As the first and second driving cam gears 51 and 52 are rotated, the driven cam 55 conducts a cam movement, thereby being linearly moved back and forth along the first and second hinge shafts 58 and 59 in the direction of the first and second hinge axes A1 and A2. As the cam movement is conducted between the single driven cam 55 and the first and second driving cam gears 51 and 52, a stopping force is provided to the first or second housing (see FIG. 1).

Figure 10:
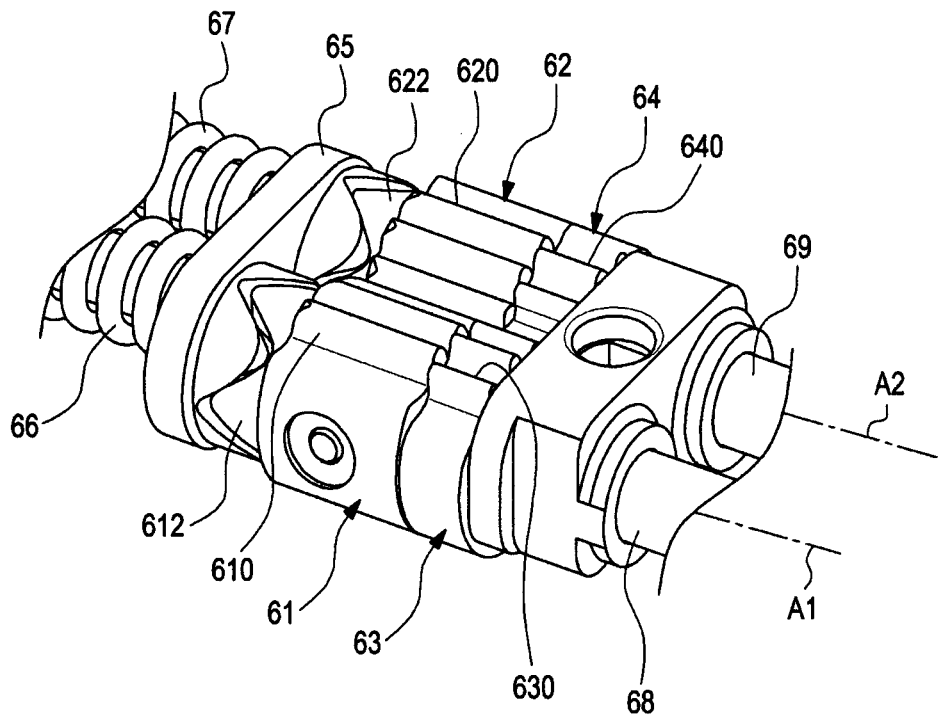
FIG. 10 is a perspective view showing the first and second driving units of a gear hinge device in accordance with a third exemplary embodiment of the present invention.

FIG. 10 shows a gear hinge device including first and second driving units in accordance with an exemplary third embodiment of the present invention, in which because the present embodiment is the same in construction with the first and second embodiments except the first and second driving units, only the constructions of the first and second driving units will be described.

As shown in FIG. 10, the first driving unit includes a first driving cam gear 61, a first auxiliary gear 63, a first hinge spring 66 and a single driven cam 65. The first driving cam gear 61 causes a cam action and gear action as it is rotated. For this purpose, the first driving cam gear 61 includes a first set of gear teeth 610, and a first set of cam teeth 612. The first set of gear teeth 610 are provided on the peripheral surface of the first driving cam gear 61, and the first set of cam teeth 612 are provided on one end face of the first driving cam gear 61. The first set of gear teeth 610 are arranged in a predetermined area on the peripheral surface, and the first set of cam teeth 612 are provided in such a manner that peaks and valleys are alternately arranged.

The first auxiliary gear 63 is coupled to the first driving cam gear 61 in a direction along the first hinge axis A1 to conduct a gear action together with the first driving cam gear 61. The first auxiliary gear 63 includes a first set of auxiliary gear teeth 630 on the peripheral surface thereof, and a first coupling part (not shown but equal to that shown in FIG. 5) on an end face thereof. The first set of auxiliary gear teeth 630 are arranged in a predetermined area on the peripheral surface. The first coupling part is a first protrusion extending in the direction of the first hinge axis (toward the first driving cam gear side), in which the first coupling part integrally couples the first auxiliary gear 63 to the first driving cam gear 61 in the direction of the first hinge axis, so that the first auxiliary gear 63 and the first driving cam gear 61 can be rotated in unison.

The second driving unit includes a second driving cam gear 62, a second auxiliary gear 64, and a second hinge spring 67. The second driving cam gear 62 causes a cam action and gear action as it is rotated. For this purpose, the second driving cam gear 62 includes a second set of gear teeth 620, and a second set of cam teeth 622. The second set of gear teeth 620 are provided on the peripheral surface of the second driving cam gear 62, and the second set of cam teeth 622 are provided on one end face of the second driving cam gear 62. The second set of gear teeth 620 are arranged in a predetermined area on the peripheral surface, and the second set of cam teeth 622 are provided in such a manner that peaks and valleys are alternately arranged.

The second auxiliary gear 64 is coupled to the second driving cam gear 62 in the direction of the second hinge axis A2 to conduct a gear action together with the second driving cam gear 62. The second auxiliary gear 64 includes a second set of auxiliary gear teeth 640 on the peripheral surface thereof, and a second coupling part (not shown but identical to that shown in FIG. 5) on an end face thereof. The second set of auxiliary gear teeth 640 are arranged in a predetermined area on the peripheral surface. The second coupling part is a second protrusion extending in the direction of the second hinge axis (toward the second driving cam gear side), in which the second coupling part integrally couples the second auxiliary gear 64 to the second driving cam gear 62 in the direction of the second hinge axis, so that the second auxiliary gear 64 and the second driving cam gear 62 can be rotated in unison.

Because each of the first and second driving cam gears 61 and 62 includes plural gear teeth, if one of the driving cam gears 61 and 62 is rotated, the other is simultaneously rotated. In addition, because each of the first and second auxiliary gears 63 and 64 includes plural gear teeth, if one of the auxiliary gears 63 and 64 is rotated, the other is simultaneously rotated.

For the purpose of smoothening the opening/closing action, the first and second driving cam gears 61 and 62 are coupled to the first and second auxiliary gears 63 and 64, in which the first and second auxiliary gears are formed from a flexible resilient material. That is, the first and second driving cam gears 61 and 62 are formed from a rigid material (for example, a rigid plastic material), whereas the first and second auxiliary gears 63 and 64 are formed from a flexible resilient material, which provides a damping effect at the time of conducting a gear action (opening/closing the portable apparatus). That is, although each of the first and second auxiliary gears 63 and 64 is kept in the original shape thereof to a certain degree when they are not operated, they are engaged with the first and second driving cam gears 61 and 62 in a slightly compressed condition, respectively, when they are operated.

As compared to the gear teeth provided on the peripheral surface of the first driving cam gear 61, the gear teeth 630 provided on the peripheral surface of the first auxiliary gear 63 may be formed in a number equal to that of the gear teeth of the first driving cam gear 61 and/or in a phase shift different from that of the gear teeth of the first driving cam gear 61. In addition, the gear teeth 640 provided on the peripheral surface of the second auxiliary gear 64 may be formed in a number equal to or different from that of the gear teeth 620 provided on the peripheral surface of the second driving cam gear 62, and/or may be fixed in a phase shift equal to or different from that of the gear teeth 620 provided on the peripheral surface of the second driving cam gear 62.

In accordance with the exemplary embodiment described herein, the gear teeth 630 formed on the peripheral surface of the first auxiliary gear 63 is fixed in a number and phase shift that are different from those of the gear teeth 630 formed on the peripheral surface of the first driving cam gear 61, and the gear teeth 640 formed on the peripheral surface of the second auxiliary gear 64 is fixed in a number and phase shift that are different from those of the gear teeth 620 formed on the peripheral surface of the second driving cam gear 62. Although the gear teeth of the first and second auxiliary gears are provided in the number and phase shift that are different from those of the first and second driving cam gears, a smooth gear action, in particular a smooth and soft gear action can be provided because the first and second auxiliary gears are formed from a flexible resilient material.

In addition, considering the flexibility of the first and second auxiliary gears 63 and 64, the auxiliary gears are formed slightly larger than the first and second driving cam gears 61 and 62, respectively. In the entire sizes, the first and second auxiliary gears 63 and 64 are larger than the first and second driving cam gears 61 and 62, respectively. That is, the first and second auxiliary gears 63 and 64 are formed to be larger than the first and second driving cam gears 61 and 62, respectively, in terms of tooth size as well as diameter. This is implemented so as to ensure that the gear action therebetween can be smoothly conducted in consideration of the fact that the auxiliary gears are compressed when the hinge device is operated (i.e., when the auxiliary gears are engaged with the driving cam gears). Of course, the first and second driving cam gears 61 and 62 are formed to have the same construction, and the first and second auxiliary gears 63 and 64 are formed to have the same construction. In addition, because the first and second auxiliary gears 63 and 64 are formed from a flexible resilient material, a smooth gear action can be obtained due to the first and second auxiliary gears being slightly compressed at the time of conducting the gear action.

The single driven cam 65 is engaged with each of the first and second driving cam gears 61 and 62 to conduct a cam action. The driven cam 65 is supported by the first and second hinge springs 66 and 67 to be in close contact with the first and second driving cam gears 61 and 62. As the first and second driving cam gears 61 and 62 are rotated, the driven cam conducts a cam movement, thereby being linearly moved back and forth along the first and second hinge shafts 68 and 69 in s direction along the first and second hinge axes A1 and A2. As the cam movement is conducted between the single driven cam 65 and the first and second driving cam gears 61 and 62, a stopping force is provided to the first or second housing (see FIG. 1).

Figure 11:
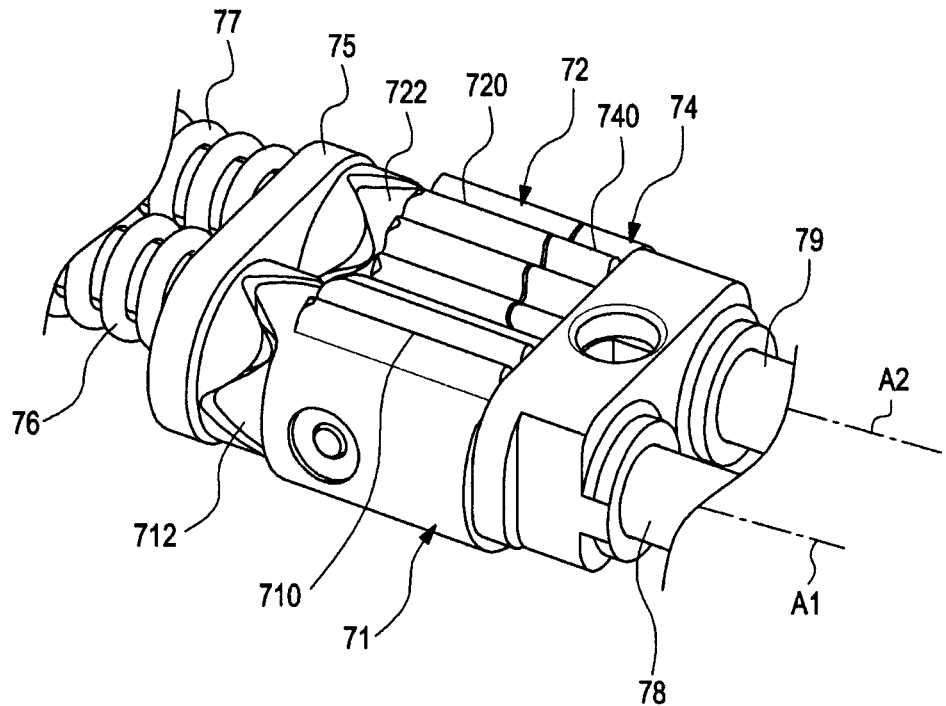
FIG. 11 is a perspective view showing the first and second driving units of a gear hinge device in accordance with a fourth exemplary embodiment of the present invention.

FIG. 11 shows a gear hinge device including first and second driving units in accordance with an exemplary fourth embodiment of the present invention, in which because the present embodiment is the same in construction with the first to third embodiments except for the first and second driving units, only the constructions of the first and second driving units will be described.

As shown in FIG. 11, the first driving unit includes a first driving cam gear 71, a first hinge spring 76 and a single driven cam 75. The first driving cam gear 71 conducts a cam action and gear action as it is rotated. For this purpose, the first driving cam gear 71 includes a first set of gear teeth 710, and a first set of cam teeth 712. The first set of gear teeth 710 are provided on the peripheral surface of the first driving cam gear 71, and the first set of cam teeth 712 are provided on one end face of the first driving cam gear 71. The first set of gear teeth 710 are arranged in a predetermined area on the peripheral surface, and the first set of cam teeth 712 are provided in such a manner that peaks and valleys are alternately arranged.

The second driving unit includes a second driving cam gear 72, an auxiliary gear 74, and a second hinge spring 77, and a single driven cam 75. The second driving cam gear 72 conducts a cam action and gear action as it is rotated. For this purpose, the second driving cam gear 72 includes a second set of gear teeth 720, and a second set of cam teeth 722. The second set of gear teeth 720 are provided on the peripheral surface of the second driving cam gear 72, and the second set of cam teeth 722 are provided on one end face of second first driving cam gear 72. The second set of gear teeth 720 are arranged in a predetermined area on the peripheral surface, and the second set of cam teeth 722 are provided in such a manner that peaks and valleys are alternately arranged.

The auxiliary gear 74 is coupled to the second driving cam gear 72 in the direction of the second hinge axis A2 to conduct a gear action together with the second driving cam gear 72. The auxiliary gear 74 includes a set of auxiliary gear teeth 740 on the peripheral surface thereof, and a second coupling part (not shown but identical to that shown in FIG. 5) on an end face thereof. The second set of auxiliary gear teeth 740 is arranged in a predetermined area on the peripheral surface. The second coupling part is a second protrusion extending in the direction of the second hinge axis (toward the second driving cam gear side), in which the second coupling part integrally couples the second auxiliary gear 74 to the second driving cam gear 72 in the direction of the second hinge axis, so that the second auxiliary gear 74 and the second driving cam gear 72 can be rotated in unison. Because each of the first and second driving cam gears 71 and 72 includes plural gear teeth, if one of the driving cam gears 71 and 72 is rotated, the other is simultaneously rotated.

For the purpose of smoothening the opening/closing action, the first and second driving cam gears 71 and 72 are coupled to the auxiliary gear 74, in which the auxiliary gear is formed from a flexible resilient material. That is, the first and second driving cam gears 71 and 72 are formed from a rigid material (for example, a rigid plastic material), whereas the auxiliary gear 74 is formed from a flexible resilient material, which provides a damping effect at the time of conducting a gear action (opening/closing the portable apparatus). That is, although each of the auxiliary gears 74 is kept in the original shape thereof to a certain degree when it is not operated, it is engaged with the first driving cam gear 71 in a slightly compressed condition, respectively, when it is operated.

At this time, the gear teeth 740 provided on the peripheral surface of the first auxiliary gear 74 may be formed in a number equal to or different from that of the gear teeth 720 provided on the peripheral surface of the second driving cam gear 72, and/or may be fixed in a phase shift equal to or different from that of the gear teeth 720. Because the auxiliary gear is formed from a flexible resilient material, a smooth gear action, in particular a smooth and soft gear action can be provided.

In addition, considering the flexibility of the auxiliary gear 74, the auxiliary gear may be formed slightly larger than the second driving cam gears 72. In the entire sizes, the gear 74 is larger than the second driving cam gear 72. That is, the auxiliary gear 74 is formed to be larger than the second driving cam gear 72 in terms of tooth size as well as diameter. This is implemented so as to ensure that the gear action therebetween can be smoothly conducted in consideration of the fact that the auxiliary gear is compressed when the hinge device is operated (i.e., when the auxiliary gear are engaged with the second driving cam gear). Of course, the first and second driving cam gears 71 and 72 are formed to have the same construction, and the auxiliary gear 74 is formed to have a construction that is different from those of the first and second driving cam gears. Because the auxiliary gear 74 is formed from a flexible resilient material, a smooth gear action can be obtained only when the auxiliary gear is slightly compressed at the time of conducting the gear action.

The single driven cam 75 is engaged with each of the first and second driving cam gears 71 and 72 to cause a cam action when cam gears 71 and 72 are rotated about their respective axes. The driven cam 75 is supported by the first and second hinge springs 76 and 77 to be in close contact with the first and second driving cam gears 71 and 72. As the first and second driving cam gears 71 and 72 are rotated, the driven cam 75 conducts a cam movement, thereby being linearly moved back and forth along the first and second hinge shafts 78 and 79 in a direction along the first and second hinge axes A1 and A2. As the cam movement is conducted between the single driven cam 75 and the first and second driving cam gears 71 and 72, a stopping force is provided to the first or second housing (see FIG. 1).

In addition, although it has been exemplified that the gear teeth 740 of the auxiliary gear 74 are provided in a number and phase shift that are equal to those of the gear teeth 720 of the second driving cam gear 72, it would be apparent to one skilled in the art that it is possible to modify the auxiliary gear 74 to have the same number and a different phase shift of teeth or to have a different number and a different phase shift of teeth as compared to those of the teeth of the second driving cam gear 72.

In addition, the auxiliary gear 74 is arranged coaxially to the second driving cam gear 72 and the second hinge shaft 79, in which the mounting length of the second driving cam gear 72 and the auxiliary gear 74 in the direction longitudinally along the second hinge axis A2 is preferably the same with the mounting length of the first driving cam gear 71. Possibly, the mounting length of the second driving cam gear 72 and the auxiliary gear 74 may be slightly longer or shorter than the mounting length of the first driving cam gear 72 in the direction along the hinge axis.

In addition, although it has been exemplified that the gear hinge device has only one flexible gear mounted coaxially to the second driving cam gear, it is possible to mount two or more auxiliary gears coaxially to the driving cam gears.

As described above, the present invention employs one or more flexible auxiliary gears in a gear hinge device that provides first and second hinge axes, thereby obtaining a smooth opening/closing action (operating feeling) of a portable terminal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A gear hinge device for connecting first and second housings of a portable terminal in such a manner that the first and second housings can be rotated about first and second hinge axes, respectively, the gear hinge device comprising:
   a first driving unit comprising a first driving cam gear that is rotated about the first hinge axis, and a first auxiliary gear integrally coupled to the first cam gear by a first coupling part; and
   a second driving unit comprising a second driving cam gear that is engaged with the first driving cam gear and rotated about the second hinge axis that is parallel to the first hinge axis, and a second auxiliary gear integrally coupled to the second, cam gear by a second coupling part;
   a single driven cam being engaged with the first and second driving cam gears to conduct a cam action, wherein the single driven earn is linearly moved along the first and second hinge axes in response to rotation of the first and second driving cam gears,
   wherein each of the first driving cam gear, the first auxiliary gear, the second driving cam gear and the second auxiliary gear is provided with a set of gear teeth, and
   wherein the first and second driving cam gears are arranged coaxially to the first and second auxiliary gears, respectively, and the first and second auxiliary gears are arranged to be engaged with each other, and
   wherein the first and second coupling parts comprise first and second protrusions that extend from the first and second auxiliary gears in a direction toward the first and second driving cant gears respectively along the first and second hinge axes and coupled to the first and second driving earn gears, respectively.

2. The gear hinge device as claimed in claim 1, wherein the first driving cam gear and the first auxiliary gear are formed from different materials, and the second driving cam gear and the second auxiliary gear are formed from different materials respectively.

3. The gear hinge device as claimed in claim 2, wherein the first and second auxiliary gears are formed from a flexible resilient material.

4. The gear hinge device as claimed in claim 3, wherein the gear teeth of the first driving cam gear and the gear teeth of the first auxiliary gear have a phase shift that is different from each other, and the gear teeth of the second driving cam gear and the gear teeth of the second auxiliary gear have a phase shift that is different from each other.

5. The gear hinge device as claimed in claim 1, wherein a number of gear teeth of the first driving cam gear and the second driving cam gear and the number of the gear teeth of the first auxiliary gear and the second auxiliary gear are different from each other.

6. The gear hinge device as claimed in claim 1, wherein a number of the gear teeth of the first driving cam gear and the second driving cam gear and the number of the gear teeth of the first auxiliary gear and the second auxiliary gear are equal to each other.

7. The gear hinge device as claimed in claim 3, wherein the first driving cam gear and the first auxiliary gear have a different size, and wherein the second driving cam gear and the second auxiliary gear have a different size.

8. The gear hinge device as claimed in claim 7, wherein the first and second auxiliary gears are larger than the first and second driving cam gears, respectively.

9. The gear hinge device as claimed in claim 7, wherein each of the gear teeth of the first and second auxiliary gears is larger than each of the gear teeth of the first and second driving cam gears.

10. The gear hinge device as claimed in claim 1, further comprising first and second hinge springs, wherein the single driven cam is supported by forces exerted by the first and second hinge springs, and wherein the single driven cam is in contact with one side of each of the first and second driving cam gears, and is engaged with the first and second driving cams to conduct a cam action, and further comprising a coupling guide bushing provided on another side of the first and second driving cam gears to bind the first and second auxiliary gears to a first hinge shaft and second hinge shafts, respectively.

11. The gear hinge device as claimed in claim 1, wherein the gear teeth of the first auxiliary gear are provided in a number and phase shift that are different from those of the gear teeth of the first driving cam gear, and the gear teeth of the second auxiliary gear are provided in a number and phase shift that are different from those of the gear teeth of the second driving cam gear.

12. The gear hinge device as claimed in claim 1, wherein the gear teeth of the first auxiliary gear and the second auxiliary gear are provided in a number equal to the number of the gear teeth of the first driving cam gear and the second driving cam gear but wherein a phase shift of the gear teeth of the first driving cam gear and the second driving gear, are different from the first auxiliary gear and the second auxiliary gear.

13. A gear hinge device for connecting first and second housings of a portable terminal in such a manner that the first and second housings can be rotated about first and second hinge axes, respectively, wherein the gear hinge device comprises:
  a first driving unit comprising a first driving cam gear that is rotated about the first hinge axis; and
  a second driving unit comprising a second driving cam gear that is engaged with the first driving cam gear and rotated about the second hinge axis that is parallel to the first hinge axis, and a flexible auxiliary gear that is arranged coaxially to the second driving cam gear and is integrally coupled to the first driving cam gear; and
  a single driven cam being engaged with the first and second driving cam gears to conduct a cam action, wherein the single driven cam is linearly moved along the first and second hinge axes in response to rotation of the first and second driving cam gears,
  wherein each of the first driving cam gear, the second driving cam gear and the auxiliary gear is provided with a set of gear teeth, and
  wherein the flexible auxiliary gear comprises a protrusion that extends from the flexible auxiliary gear in a direction toward the second driving cam gear along the second hinge axes and couples to the second driving cam gear.

14. The gear hinge device as claimed in claim 13, wherein the gear teeth of the second driving cam gear has a phase shift that is different from the phase shift of the auxiliary gear.

15. The gear hinge device as claimed in claim 13, wherein the second driving cam gear and the auxiliary gear have a different number of teeth from each other.

16. The gear hinge device as claimed in claim 13, wherein the second driving cam gear and the auxiliary gear have a number of teeth that are equal to each other.

17. The gear hinge device as claimed in claim 13, wherein the second driving cam gear has a size different from that of the auxiliary gear.

18. The gear hinge device as claimed in claim 17, wherein the auxiliary gear is larger than the second driving earn gear.

19. The gear hinge device as claimed in claim 18, wherein each of the gear teeth of the auxiliary gear is larger than each of the gear teeth of the second driving cam gear.

20. The gear hinge device as claimed in claim 13, wherein a longitudinal mounting length of the second driving cam gear and the auxiliary gear in a direction of the second hinge axis is at least as long as the longitudinal mounting length of the first driving cam gear in a direction of the first hinge axis.

* * * * *

UNITED STATES PATENT AND TRADEMARK OFFICE
CERTIFICATE OF CORRECTION

| | |
|---|---|
| PATENT NO. | : 8,938,855 B2 |
| APPLICATION NO. | : 13/687096 |
| DATED | : January 27, 2015 |
| INVENTOR(S) | : Sung-Ho Ahn et al. |

It is certified that error appears in the above-identified patent and that said Letters Patent is hereby corrected as shown below:

In the Claims

Column 14, Claim 1, Lines 12-13 should read as follows:
--...coupling part; a second...--

Column 14, Claim 1, Line 17 should read as follows:
--...to the second cam...--

Column 14, Claim 1, Lines 18-19 should read as follows:
--...part; and a single...--

Column 14, Claim 1, Line 21 should read as follows:
--...single driven cam is...--

Column 14, Claim 1, Lines 26-27 should read as follows:
--...gear teeth, wherein the...--

Column 14, Claim 1, Line 34 should read as follows:
--...second driving cam gears...--

Column 14, Claim 1, Line 36 should read as follows:
--...driving cam gears, respectively...--

Column 15, Claim 10, Lines 14-15 should read as follows:
--...second hinge shaft, respectively...--

Column 15, Claim 13, Lines 36-37 should read as follows:
--...hinge axis; a second...--

Signed and Sealed this
Twelfth Day of May, 2015

Michelle K. Lee
*Director of the United States Patent and Trademark Office*

Column 16, Claim 18, Line 30 should read as follows:
--...second driving cam gear...--